(No Model.)

A. WOODWARD.
CORN PLANTER.

No. 269,150.  Patented Dec. 12, 1882.

Witnesses.
Robt Johnston
W. H. Kern

Inventor.
A. Woodward,
per
J. A. Lehmann,
atty.

UNITED STATES PATENT OFFICE.

ANDERSON WOODWARD, OF CAMERON, ILLINOIS, ASSIGNOR OF ONE-HALF TO O. V. PORTER, OF SAME PLACE.

CORN-PLANTER.

SPECIFICATION forming part of Letters Patent No. 269,150, dated December 12, 1882.

Application filed August 5, 1882. (No model.)

*To all whom it may concern:*

Be it known that I, A. WOODWARD, of Cameron, in the county of Warren and State of Illinois, have invented certain new and useful Improvements in Corn-Planters; and I do hereby declare the following to be a full, clear, and exact description of the invention, such as will enable others skilled in the art to which it pertains to make and use it, reference being had to the accompanying drawings, which form part of this specification.

My invention relates to an improvement in corn-planters; and it consists in the combination of a corn-planter which is mounted upon the usual driving-wheels, with an independent pair of small wheels, which run upon the ground in between the large wheels, and which are secured upon the cranked shaft which operates the seed-slides as the machine is drawn forward.

It further consists in the combination of suitable flat springs, which are secured to the frame or the seed-box, and which have the boxes for the crank-shaft secured to their rear ends, and which springs keep the small wheels, which are secured to the crank-shaft, pressed downward upon the ground, as will be more fully described hereinafter.

The object of my invention is to produce a corn-planter which is provided with a separate pair of covering-wheels, which not only cover the corn as fast as it is dropped, but check off the field, so as to show exactly where each hill is.

Figure 1:
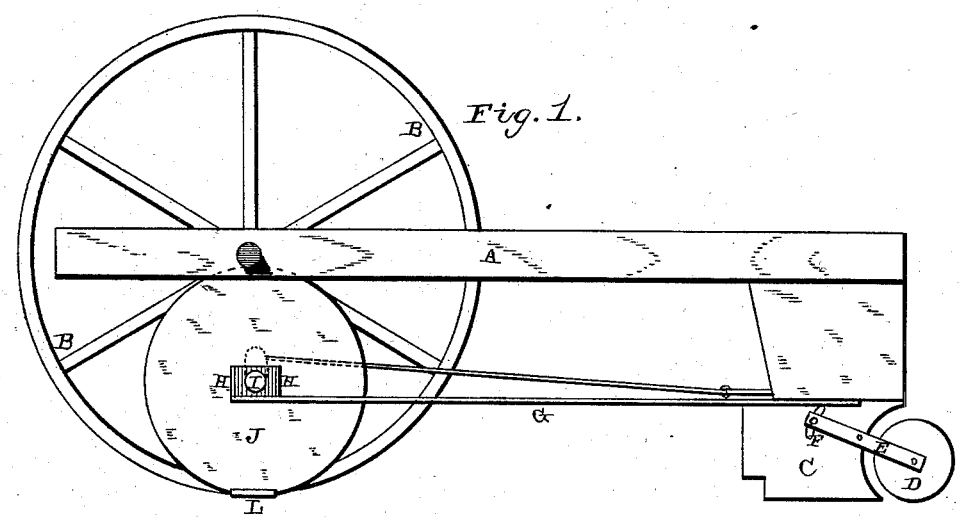
Figure 2:
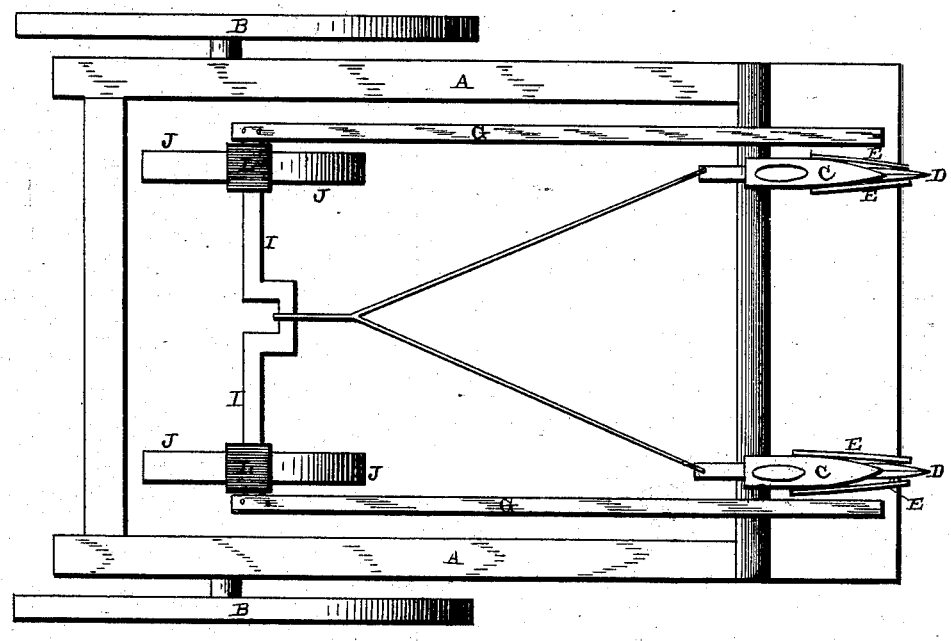

Figure 1 is a side elevation of my invention with the inner driving-wheel removed. Fig. 2 is an inverted view of the planter.

A represents a suitable frame, which is mounted upon the driving-wheels B. Secured to the under side of the front end of the frame are the seed-boxes, and the front end of the frame is supported by the furrow openers or shoes C, which are secured to the under sides of this box. The front edges of the furrow-openers are sharpened and curved out, as shown, so as to make room for the revolving colter D, which is pivoted between the supporting bars or rods E. These rods are pivoted upon the shoes and have their rear ends held in curved slots F, which are formed in the sides of the shoe. By means of these curved slots the rear ends of the levers can be adjusted up and down, so as to raise or lower the colters. By this means the colters can be adjusted so as to run on a level with the bottom of the shoes, or can be adjusted so as to cut below the lower edge of the shoes, as may be preferred. Secured to the under sides of these seed-boxes are the two flat springs G, which extend backward a suitable distance, and have secured upon their rear ends the boxes H, in which the cranked shaft I is journaled. Upon this cranked shaft are secured two wheels, J, which are intended to run upon the ground in a straight line with the shoes or furrow-openers, so as to run upon the ground and cover the corn as fast as it is dropped. Secured to each wheel is a flat piece, L, of any suitable length and width, which is intended to run directly upon the top of the corn as it lies upon the ground, and not only force it into the ground, but check off the ground at the same time. In order that these flat pieces may run directly upon the corn where it is dropped, the circumference of these wheels should be just equal to the distance between that point in the shoes where the corn is dropped upon the ground and that point where the wheels bear upon the ground. By this construction it is only necessary to turn the small wheels so that this flat part rests directly upon the ground when the machine is started, and then the flat part will run upon the corn as it lies upon the ground all across the field. When the end of the row is reached and it is discovered that in the starting these flat pieces will not run directly upon the grains of corn, it is only necessary for the driver to turn the cranked shaft so as to bring the wheels in the necessary position. The flat springs upon which the boxes are placed are intended to allow the cranked shaft a free vertical play, so that it can adjust itself to all inequalities of the ground; and these springs can be so shaped that they will press the wheels upon the ground with any desired degree of force in case the wheels have not sufficient weight of their own to press the grains of corn into the ground deep enough. From the cranked shaft extends a connecting rod or rods, which unite the crank to the seed-slides, so that as the frictional contact of the small wheels upon the ground causes the shaft to revolve the slides are made to work back and forth, in the usual manner.

Having thus described my invention, I claim—

1. In a corn-planter, the combination of a cranked shaft, suitable wheels attached to the cranked shaft, connecting-rods, and seed-slides, the cranked shaft and wheels being independent of the main frame and driving-wheels, substantially as set forth.

2. The combination of a corn-planter mounted upon the usual driving-wheels with suitable supporting-springs, the cranked shaft provided with wheels, the connecting-rods, and seed-slides, substantially as specified.

In testimony whereof I affix my signature in presence of two witnesses.

ANDERSON WOODWARD.

Witnesses:
O. V. PORTER,
H. M. BALDWIN.